No. 882,954. PATENTED MAR. 24, 1908.
F. M. MOSS.
FODDER AND CORN SHOCK BINDER.
APPLICATION FILED NOV. 4, 1907.
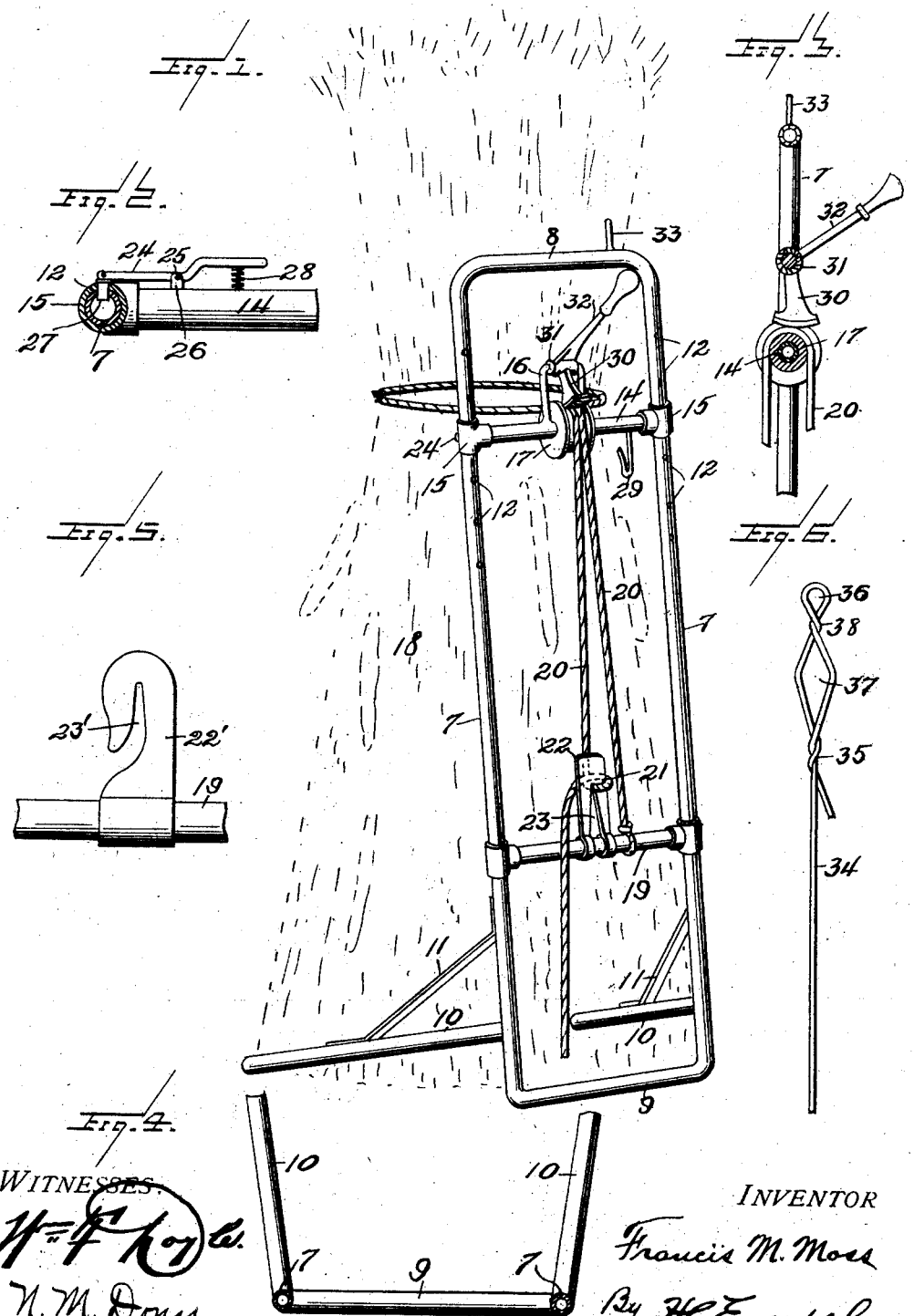
WITNESSES
INVENTOR
Francis M. Moss
By H. C. Evert
Attorneys

UNITED STATES PATENT OFFICE.

FRANCIS M. MOSS, OF BURKES GARDEN, VIRGINIA.

FODDER AND CORN-SHOCK BINDER.

No. 882,954.  Specification of Letters Patent.  Patented March 24, 1908.

Application filed November 4, 1907. Serial No. 400,647.

*To all whom it may concern:*

Be it known that I, FRANCIS M. MOSS, a citizen of the United States of America, residing at Burkes Garden, in the county of Tazewell and State of Virginia, have invented certain new and useful Improvements in Fodder and Corn-Shock Binders, of which the following is a specification, reference being had therein to the accompanying drawing.

This invention relates to certain new and useful improvements in fodder and corn shock binders, and the primary object of the invention is to provide a fodder and corn shock binder by means of which a shock of corn or a bunch of fodder may be drawn tightly together at a desired point in order to permit of tying the same in its compressed form with a wire tie or other form of tie which could not be employed for compressing the shock to the desired state.

A further object of the invention is to provide a binder which can be conveniently moved from shock to shock as required, readily placed in position for compressing the shock, and easily and quickly operated to effect the desired compression of the shock that the tie may be placed thereon.

Still further objects of the invention will be hereinafter pointed out as the description proceeds, the invention residing in the novel combination and arrangement of parts as will be hereinafter more fully described and then particularly claimed.

In describing the invention in detail reference will be had to the accompanying drawing forming a part of this application and showing a practical embodiment of the invention, and while this embodiment of the invention will be described in detail, it will be understood that various changes may be made in minor parts of the invention without departing from the spirit thereof.

In the drawings:—Figure 1 is a perspective view of a fodder and corn shock binder constructed in accordance with my invention, showing the binder in position with a shock compressed ready for receiving the tie, the shock being shown in dotted lines. Fig. 2 is a partial plan and partial horizontal sectional view, showing in detail one of the catches which hold the upper sliding bar in desired position. Fig. 3 is a detail view partially in vertical section and partially in side elevation of the device. Fig. 4 is a view partially in plan and partially in horizontal section of a part of the supporting frame of the device, showing the flare or inclination which is given to the supporting braces of the frame. Fig. 5 is a detail view in side elevation of a modified form of catch which may be employed in forming a hitch with the compressing-rope. Fig. 6 is a detail plan view of a portion of a wire tie such as is used in binding the shock after the same has been compressed.

The device comprises a substantially rectangular frame which may be made either of tubing, or of solid rod, and although the frame has been shown or illustrated as formed of tubing, it is to be understood that I do not limit myself thereto, though by the use of tubing I am enabled to lighten the frame to a considerable extent. When made of tubing the sections thereof will of course be connected together by unions at any desired points, and similarly where the frame is made of solid rod, the sections of the rods or the ends thereof if the frame is made of one piece will be suitably connected by a union or equivalent means.

The frame as stated is substantially rectangular in shape embodying the two vertical posts or uprights 7 connected at their upper ends by the top bar 8 and at their lower ends by the base bar 9. This frame is supported by means of the base bar 9 and supporting legs 10, attached one to each upright 7 near the lower ends thereof, and extending therefrom downwardly at an inclination so that these supporting legs at their outer ends are practically on a plane with the base bar 9. Thus, when set up in position shown in Fig. 1 of the drawings, the supporting frame will have a slight inclination towards the shock against which it is to be placed. The said supporting legs 10 flare outwardly as clearly shown in Fig. 4 of the drawings in order that the binder may be more easily placed in position against the shock, suitable braces 11 being provided between the supporting legs 10 and the uprights 7.

The uprights 7 are each provided with a plurality of apertures 12. Where these uprights are made of tubular material, it will of course only be necessary to have these apertures drilled through the rear face of said uprights as shown in Fig. 2 of the drawings, but it will be evident that the apertures may be drilled entirely through the uprights as is shown in Fig. 1. These apertures are provided for the purpose of receiving catches serving to hold a portion of the binding mechanism, at a desired elevation on the supporting frame. The said binding mechanism comprises a cross bar 14 provided at its ends with eyes or sleeves 15 which receive the uprights 7 and which are slidable thereon. Rising from this cross bar 14 intermediate its ends is a stirrup 16, and on the cross bar 14 between the arms of said stirrup is a pulley or roller 17 over which the compression rope by means of which the shock 18 is compressed operates.

Arranged to slide on the uprights 7 of the frame is a cross bar 19 which is employed for the purpose of tightening the compression rope. This tightening member 19 has one end of the compressing rope 20 fixedly secured thereto, the rope being then extended over the pulley or roller 17, and, when the device is in position against a shock as shown in Fig. 1 of the drawings, the free end of the rope is passed around the shock and brought over the pully or roller 17 and then given a hitch as shown at 21 to a suitable form of securing clasp 22 carried by the tightening member 19. The said rope securing clasp or tightening member 22 may be of any desirable form with which a hitch of the rope can be quickly and easily effected. As shown in Fig. 1 of the drawings it comprises an upright arm provided with a substantially V-shaped slot 23 through which the end of the rope is passed, the rope being then hitched over the upper end of the arm and between the latter and the downwardly extending strand of the rope as clearly seen in Fig. 1 so that a close hitch is effected. If desired, a form of clasp such as shown in Fig. 5 may be employed in which the arm 22′ is shown as provided with a slot 23′ opening out at one side of the arm. A clasp of this form will enable the rope to be inserted easily and drawn up into the narrow portion of the slot and then hitched over the arm in the manner as shown in Fig. 1.

The cross head 14 is adjusted on the uprights 7 to the desired position where it is held by suitable catches, such as shown in Fig. 2 comprising arms 24 pivoted at 25 to lugs 26 on the rear face of the cross arm 14, the said arms carrying at their outer ends pins 27 which take into the apertures 12 provided therefor in the uprights 7 and eyes or sleeves 15. These pins are held in engaging position by springs 28 interposed between the arms 24 and the cross arm 14.

The cross arm 14 is provided with a suitable hook or catch 29, which is employed for the purpose of holding the tightening member 19 elevated while passing the compressing rope around the shock. This is accomplished by simply engaging the rope 20 at a point near the member 19 with said hook or catch 29 so as to hold said member 19 elevated, as will be readily understood. After the compressing rope has been passed around the shock and the hitch 21 effected, the rope is then disengaged from the catch or hook 29 and the member 19 is drawn downwardly on the supports so as to effect the compression of the shock. The member 19 may be drawn down by hand part of the way until it is in a convenient position where the foot may be placed thereon so as to force the same further downward on the supports or uprights 7, and thus afford more leverage for compression of the shock. After the desired compression of the shock has been effected, means is provided for holding the same in its compressed state until the wire tie can be secured around the shock. This means in the present illustration I have shown as comprising a dog 30 carried by an eye or sleeve 31 mounted on the top cross bar of the stirrup 16 and provided with a suitable handle 32 for operating the same. The said dog may be provided with serrations or teeth on its underneath face and is of such length that it will swing in on top of the rope when the latter passes over the pulley and bind said rope firmly in position as shown in Fig. 3 of the drawings. Thus the shock is securely held in compressed state until the wire tie or other form of tie employed can be secured around said shock.

As heretofore stated, wire ties are generally used. These ties come in specified lengths, but it is desirable to provide means whereby the ends of the tie can be securely fastened together without danger of their becoming attached. For this purpose, I provide an upwardly extending pin 33 preferably located on the top cross bar 8, desirably adjacent the right corner thereof. By providing this pin, I have means right at hand whereby a loop may be formed in one end of the tie in order that the other end of the tie may be securely fastened thereto. To accomplish this, I take an ordinary wire tie 34 as shown in Fig. 6, pass one end of the same around the pin, and intertwist one end with the body of the tie as shown at 35; then by means of pliers or other suitable instrument, I make two or three twists to the wire and thereby form the eyes 36 and 37, the eye 36 it will be understood being the one occupied by the pin 33 whereas the eye 37 is the one occupied during the formation of the tie end by the implement used in making the twists. The tie is then lifted off the pin 33, passed around the compressed portion of the shock 18, the free end of the tie is then passed through eye 37 and said free end given several twists around the twisted portion 38 of the tie, and the end inserted through eye 36. Thus a hitch is formed on the wire tie which it is impossible to break loose under strain, the hitch tightening as the strain thereon increases.

It will of course be understood that while the device is particularly adapted to compress the shock so as to permit the employment of wire ties it is by no means confined to such use. It will be evident by the construction shown and described in detail that the shock may be quickly and easily compressed to permit the placing therearound of a desired tie or binder to hold it in its compressed state; the device is extremely strong, although comparatively light so that it may be carried without inconvenience from shock to shock for use as required.

Having fully described my invention, what I claim as new, and desire to secure by Letters Patent is:—

1. In a device of the type described, a supporting-frame, a cross-bar slidably-mounted thereon, means for securing said cross bar in desired position on the frame, a tightening-bar slidably mounted on said frame, a compressing-rope secured at one end to said tightening-bar and operating over said cross-bar, means carried by said cross-bar for clamping said compressing-rope thereto, and means for effecting a hitch of said rope with said tightening bar.

2. In a corn shock binder, a supporting frame provided at its lower end with flared supporting-legs, a vertically adjustable cross-bar carried by said frame, a tightening-bar slidably-mounted on said frame, a compressing-rope attached at one end to said tightening-bar and operating over said cross-bar, means for detachably connecting the other end of said rope with the tightening-bar, and means for clamping the rope to the tightening bar after compression of the shock.

3. In a corn shock binder, a supporting frame, a vertically-adjustable rope-carrying member on said frame, a compression rope, a tightening-member slidable on the frame having one end of said rope fixedly-secured thereto, means for effecting a hitch between the other end of said rope and the tightening-bar, and means for clamping the rope after compression of the shock to the rope-carrying member.

4. In a corn shock binder, a supporting frame, a cross-bar adjustable thereon, means for securing the cross bar in adjusted position, a pulley carried by said bar, a tightening bar slidably-mounted on the frame, a compression-rope connected at its one end to said tightening bar and operating over said pulley, a catch for detachably-securing the other end of the rope to said tightening bar, means carried by the cross-bar for connecting the compression rope therewith to hold the tightening-bar suspended, and means for clamping the rope onto the pulley after compression of the shock is effected.

5. In a shock binder, a supporting frame, a cross-bar slidable thereon, means for securing said cross bar in adjusted position, a pulley carried by the cross-bar, a compression rope operating over said cross-bar pulley, a stirrup carried by the cross-bar, a rope-clamp carried by said stirrup for binding the rope to the pulley, a tightening bar slidable on said frame, and means carried by the tightening-bar for detachably connecting one end of the compression rope thereto.

6. In a shock-binder, a supporting frame, and a shock-compressing means carried by said frame, comprising a cross-bar adjustably-mounted on the frame, a tightening-bar slidable on the frame, a compression-rope connected at one end to said tightening-bar and operating over said cross-bar, and means for detachably-connecting the other end of said compression-rope to said tightening-bar.

7. In a corn shock binder, a supporting frame, a cross-bar adjustable on said frame, a tightening-bar slidable on said frame, a compression-rope connected at one end to the tightening-bar and operating over the cross-bar, and a catch for connecting the other end of the compression-rope with the tightening-bar.

8. A supporting-frame for shock binders, comprising parallel uprights, a top cross bar connecting the upper ends of said uprights, a pin carried by said top cross bar, a base bar connecting the uprights at their lower ends and constituting a support for the frame, and a pair of angularly extending supporting-legs connected one to each upright above the base bar, the said supporting-legs projecting downwardly at an incline to the uprights and flaring outwardly therefrom.

In testimony whereof I affix my signature in the presence of two witnesses.

FRANCIS M. MOSS.

Witnesses:
J. W. CHAPMAN,
A. P. GILLESPIE.